United States Patent [19]
Clanin et al.

[11] Patent Number: 5,138,844
[45] Date of Patent: Aug. 18, 1992

[54] CONDESNER FAN CONTROL SYSTEM FOR USE WITH VARIABLE CAPACITY COMPRESSOR

[75] Inventors: Thomas J. Clanin, Onalaska; Dennis R. Dorman, La Crosse; Robert L. Oltman, Stoddard; Merle A. Renaud, Onalaska; Paul c. Rentmeester, La Crosse, all of Wis.

[73] Assignee: American Standard Inc., New York, N.Y.

[21] Appl. No.: 503,482

[22] Filed: Apr. 3, 1990

[51] Int. Cl.⁵ .............................................. F25D 17/06
[52] U.S. Cl. ...................................... 62/89; 62/183; 62/180
[58] Field of Search ................ 62/180, 181, 183, 184, 62/89, 228.3

[56] References Cited

U.S. PATENT DOCUMENTS

| | | | |
|---|---|---|---|
| 3,112,620 | 12/1963 | Stewart | 62/183 |
| 3,152,455 | 10/1964 | Ware | 62/184 |
| 3,390,539 | 7/1968 | Miner | 62/184 |
| 4,075,865 | 2/1978 | Wills | 62/183 |
| 4,134,274 | 1/1979 | Johnsen | 62/179 |
| 4,325,225 | 4/1982 | Price, II | 62/229 |
| 4,326,387 | 4/1982 | Friedman | 62/184 |
| 4,498,308 | 2/1985 | Phillips et al. | 62/184 |
| 4,507,932 | 4/1985 | Suzuki et al. | 62/180 |
| 4,537,038 | 8/1985 | Alsenz et al. | 62/118 |
| 4,539,820 | 9/1985 | Zinsmeyer | 62/201 |
| 4,546,618 | 10/1985 | Kountz et al. | 62/201 |
| 4,589,060 | 5/1986 | Zinsmeyer | 364/148 |
| 4,590,772 | 5/1986 | Nose et al. | 62/184 |

OTHER PUBLICATIONS

E.I. Du Pont de Nemours & Company (Inc.), Thermodynamic Properties of FREON 22.

Primary Examiner—John Sollecito
Attorney, Agent, or Firm—William J. Beres; William O'Driscoll

[57] ABSTRACT

A method of controlling a multiplicity of condenser fans in a refrigeration system comprising the steps of: calculating a first difference in state between a high pressure side and a low pressure side of the refrigeration system; determining an optimum state for the refrigeration system; determining a second difference in state between the first difference and the optimum difference; and controlling the multiplicity of condenser fans if the second difference exceeds a predetermined value.

67 Claims, 4 Drawing Sheets

FIG. 1

FIG. 4A
(STANDARD)

FIG. 4B
(LOW AMBIENT)

CONDESNER FAN CONTROL SYSTEM FOR USE WITH VARIABLE CAPACITY COMPRESSOR

TECHNICAL INFORMATION

The present invention is directed to a condenser fan control system for use in a refrigeration system having a variable capacity compressor, and more particularly, to a control system for selecting the optimum number of operating condenser fans from a multiplicity of available single speed condenser fans.

BACKGROUND OF THE INVENTION

A number of problems exist in previous condenser fan control systems.

Instead of controlling condenser fans to maintain an optimum system pressure differential between the high and low pressure sides of a refrigeration system, previous systems controlled condenser fans in response to discrete predetermined, and readily identifiable system conditions. More specifically, the previous systems were event orientated. For instance, condenser fans were turned on or off as the compressor load step was increased or decreased. Similarly, condenser fans were turned on or off as outside air temperature exceeded or dropped below specific, predetermined levels. This event orientated approach compromises efficiency from a condenser fan staging point of view because such an approach does not react to system requirements unless a specific event occurs.

Previous systems responded to known criteria including outside air temperature, compressor load step and sometimes in accordance with a condenser pressure switch. Variable capacity compressors have changed this by introducing an unknown independent variable, the compressor capacity. The compressor capacity at any given time is usually unknown, is not easily determinable, and is capable of independent variance in response to system conditions. Attempts have been made to compensate for the introduction of variable capacity compressors into refrigeration systems by replacing a multiplicity of single speed condenser fans with a single larger variable speed fan. However, this requires an expensive variable speed fan, a complex control strategy, a variable speed fan controller and feedback from the variable capacity compressor to the variable speed fan controller indicating the present compressor capacity. Furthermore, the additional component requirements and controls add considerable expense and complexity to newly manufactured systems without addressing the needs of existing systems which may only intend to upgrade the compressor.

Additionally, previous systems have not taken any steps to prevent a system safety device, such as a high pressure cutout, from tripping. The tripping of a system cutout shuts down the refrigeration system until the refrigeration system is restarted.

Finally, previous condenser fan control systems did not respond well to low ambient temperatures. The operation of air cooled condensers during low ambient temperature conditions requires that the condenser airflow be reduced progressively as the ambient temperature decreases so that the condenser pressure and temperature are maintained at the level necessary for proper system operation. At low ambient temperature, previous systems were faced with the dilemma of either turning all fans off, or leaving too many fans on. Either choice compromised efficiency.

SUMMARY OF THE INVENTION

It is an object of the present invention to solve the problems of prior art condenser fan control systems.

It is an object of the present invention to provide a condenser fan control system for use with variable capacity compressors.

It is an object and advantage of the present invention that the control system maintains the lowest operable system condensing pressure.

It is a further advantage of the present invention that the condenser fan control system does not require a direct input indicative of compressor capacity and outside air temperature.

It is a further advantage of the present invention that the condenser fan control system automatically compensates for varying external conditions based upon the cumulative effect of changes within the refrigeration system.

It is an object of the present invention to provide a condenser fan control system for use with variable capacity compressors and single speed condenser fans.

It is a further object of the present invention to provide optimum condenser airflow at the lowest operational ambient temperatures.

It is an object and an advantage of the present invention to provide a condenser fan control system which modifies the fan control strategy in response to changing system conditions.

It is a further object and advantage of the present invention to keep the refrigeration system operating by taking action to prevent system safety devices, such as high pressure cutouts, from ever reaching their trip points.

The present invention provides a method of controlling a multiplicity of condenser fans in a refrigeration system comprising the steps of: calculating a first difference in state between a high pressure side and a low pressure side of the refrigeration system; determining an optimum state for the refrigeration system; determining a second difference in state between the first difference and the optimum difference; and controlling the multiplicity of condenser fans if the second difference exceeds a predetermined value.

The present invention provides a method of controlling a multiplicity of condenser fans in a refrigeration system comprising the steps of: calculating a first difference in state between a high pressure side and a low pressure side of the refrigeration system; determining an optimum state dead band for the refrigeration system; comparing the first state to the optimum state dead band; and controlling the multiplicity of condenser fans if the first state does not fall within the optimum state dead band.

The present invention provides a method of controlling a multiplicity of condenser fans in a refrigeration system comprising the steps of: calculating a first pressure difference between a high pressure side and a low pressure side of the refrigeration system; determining an optimum pressure difference for the refrigeration system; determining a second pressure difference between the first pressure difference and the optimum pressure difference; determining a cumulative pressure using the second pressure difference; and controlling the multiplicity of condenser fans if the cumulative pressure exceeds a predetermined value.

The present invention provides a method of controlling a multiplicity of condenser fans in a refrigeration system comprising the steps of: calculating a first temperature difference between a high pressure side and a low pressure side of the refrigeration system; determining an optimum temperature difference for the refrigeration system; determining a second temperature difference between the first temperature difference and the optimum temperature difference; determining a cumulative temperature using the second temperature difference; and controlling the multiplicity of condenser fans if the cumulative temperature exceeds a predetermined value.

The present invention provides a refrigeration system comprising: an evaporator; a compressor operably connected to the evaporator; a condenser operably connected to the compressor and including a housing, a plurality of full capacity condenser fans supported by the housing, and at least one half capacity condenser fan supported by the housing; an expansion valve operably connected to the evaporator and the condenser; means for determining a system pressure differential; and means, responsive to said pressure differential determining means, for controlling said full capacity fans and said half capacity fan to maintain the lowest operable system pressure.

The present invention provides a method of protecting a refrigeration system from high pressure damage comprising the steps of: continually monitoring the refrigeration system pressure; comparing the system pressure to at least one high pressure warning limit; and turning on at least one condenser fan immediately if the system pressure exceeds the warning limit.

The present invention provides a method of using condenser fans to prevent damage to a refrigeration system comprising the steps of: determining the approximate trip point of a refrigeration system safety protection device; establishing at least one warning limit at a point which is closer to the preferred range of operation than the trip point; monitoring the state of the refrigeration system; and turning on a condenser fan if the state of the refrigeration system exceeds the warning limit.

The present invention also provides a condenser for a refrigeration system comprising a housing, a plurality of full capacity condenser fans supported by said housing, and at least one half capacity condenser fan supported by said housing.

DETAILED DESCRIPTION OF THE INVENTION

Figures 1, 4A, 4B:
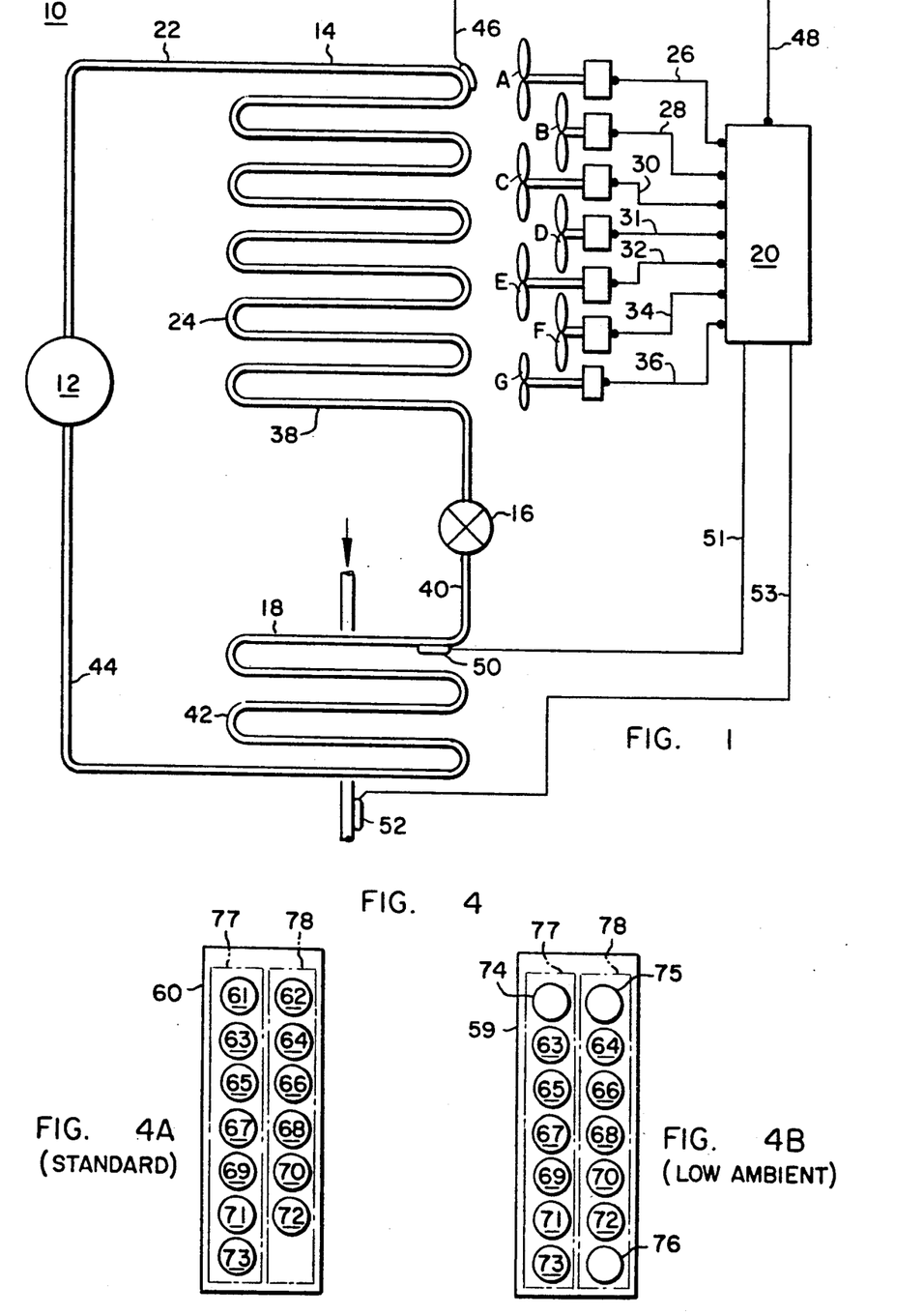
FIG. 1 shows a block diagram of the system of the present invention.
FIG. 4A shows a standard thirteen fan capacity condenser.
FIG. 4B shows the thirteen fan capacity condenser of FIG. 4A modified for operation at low ambient temperatures.

FIG. 1 shows a refrigeration system 10 for use with the present invention including a compressor 12, a condenser 14, an expansion valve 16, an evaporator 18, and a system controller 20. A hot gas line 22 carries compressed refrigerant vapor from the compressor 12 to the condenser 14 where the compressed refrigerant vapor is cooled by heat exchange in the condenser coils 24 with a cooling medium. The liquid refrigerant leaves the condenser 14 and is carried by refrigerant line 38 through the expansion valve 16 and by refrigerant line 40 to the evaporator 18. The expansion valve 16 maintains the high side pressure created by the compressor 12, and controls the volume of liquid refrigerant flow to the evaporator 18. The liquid refrigerant enters the coils 42 of the evaporator 18 and absorbs heat from a medium to be cooled, vaporizing in the process. The vaporized refrigerant is returned to the compressor 12 by suction line 44.

In the standard and low ambient embodiments discussed herein, condenser fans A, B, C, D, E, F and G vary the rate of flow of the cooling medium over the coils 24. Each fan A-G is connected to the controller 20 by a control line 26, 28, 30, 31, 32, 34 and 36 respectively, so that the controller 20 can selectively enable any combination of condenser fans A. G. In the standard embodiment which includes seven full capacity fans A-G, this allows the controller 20 to select fan capacities ranging from 1 through 7. A low ambient embodiment is also contemplated for use at low ambient temperatures which allows the controller 20 to select fan capacities ranging from 0.5 through 6.5. The low ambient embodiment includes seven condenser fans A-G, six of which are full capacity fans A-F and one of which is a half capacity fan G. The use of a half capacity fan G in the low ambient embodiment allows minimum airflow to be maintained at the lowest operational ambient temperatures.

Although the embodiments are each described in terms of seven condenser fan systems, the actual number of condenser fans is directly related to the refrigeration requirements of the system. Additionally, although the preferred embodiments are described in terms of pressure and differential pressure, temperature and pressure are equivalents which allow the condenser fan control system to be appropriately modified and altered to operate substituting temperature and temperature differential for pressure and differential pressure.

The system controller 20 is connected to a sensor 46 which senses the saturated condenser temperature in one of the U-bends of the condenser coils 24 and reports that saturated condenser temperature to the controller 20 by a connecting line 48. A second temperature sensor 50 is located in the refrigerant line 40 in proximity to the evaporator 18. This second sensor 50 senses the refrigerant temperature leaving the expansion valve, which approximates for all practical purposes the saturated evaporator temperature. A connecting line 51 enables the sensor 50 to transmit its readings to the system controller 20. A third temperature sensor 52 senses the temperature of the medium being cooled in the evaporator 18 as the medium leaves the evaporator 18 and reports that temperature to the system controller 20 by means of a connecting line 53.

The system controller 20 includes a microprocessor such as a NEC 7800 series microprocessor which implements the control system of the present invention. As in all conventional microprocessors, the NEC microprocessor includes both random access memory (RAM) and read only memory (ROM). The NEC microprocessor has an operating system which includes real-time timers for use with application programs, the real-time timers being regularly decremented by the operating system until the timer has a value of zero. Of course, other operating systems and other microprocessors can be used in the system controller 20.

Figure 2:
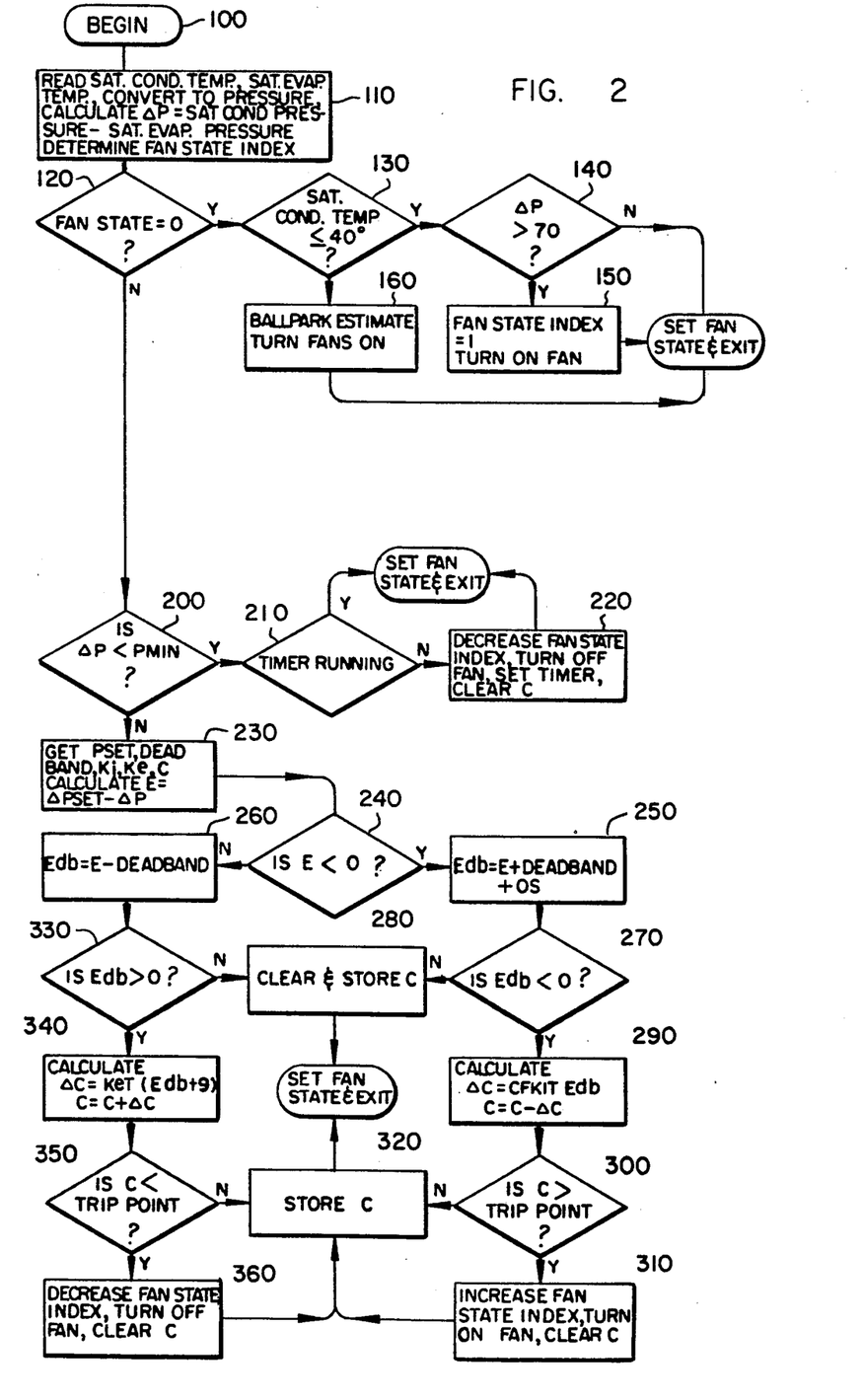
FIG. 2 shows an operational flow chart of the condenser fan control system of the present invention.

FIG. 2 is a flow chart of the present invention which in the preferred embodiment is conventionally implemented in the assembly level programming language of the NEC microprocessor. The control system can also be implemented in a high level programming language or by a series of logic gates, although programming is presently easier to implement than hardware.

The control system begins at step 100 when the system controller 20 initiates the condenser fan control system every ten seconds using a conventional interrupt routine. Initially, at step 110, saturated condenser temperature is read from the input of sensor 46 and saturated evaporator temperature is read from the input of sensor 50. Each of these temperature readings are then converted to pressure using the method shown in E.I. DuPont DeNemours & Company Publication T-22 "Thermodynamic Properties of FREON 22 Refrigerant" which is available from the "Freon" Products Division, Wilmington, Del. and which is hereby incorporated by reference. The differential pressure ($\Delta P$) is determined by subtracting saturated evaporator pressure from saturated condenser pressure.

Next, the fan state index is determined from a RAM storage location in the microprocessor of the system controller 20. The fan state index is an index to either Table 1 or Table 2 which contain values indicative of the number of active condenser fans. The fan state index is zero at system start up. Thereafter the fan state index is decremented or incremented in accordance with the condenser fan control commands and the modified fan state is saved in the RAM storage location when the condenser fan control system is exited. A fan state index of zero is never allowed after a minimum psig has been achieved and the initial start up sequence has completed.

One of Tables 1 and 2 is selected by the system designer and conventionally stored in the ROM of controller 20. Table 1 is permanently installed in the system controller's ROM if the refrigeration system is expected to be used under low ambient conditions, otherwise Table 2 is permanently installed in the system controller's ROM. Tables 1 and 2 show the possible fan states for the seven condenser fan arrangement used in the low ambient and standard embodiments of the present invention respectively. The basic difference between operation under low ambient conditions and operation under standard conditions is that a half capacity fan allows a greater variety of fan states, including the option of turning on only the half capacity fan at very low ambient temperatures. The condenser fan control system is the same for both the standard and low ambient embodiments because the differences, other than the substitution of a half capacity fan G in the low ambient embodiment, are confined to Tables 1 and 2. However, the table to be installed in the controller 20 is appropriately modified in accordance with the present invention as described herein whenever a condenser fan arrangement of other than seven fans is desired.

TABLE 1

LOW AMBIENT CONDITIONS

| Fan State Index | Fan States | Optimum Differential Pressure Setting | Deadband | High Side Gain | Low Side Gain |
|---|---|---|---|---|---|
| 1 | 0.5 | 95 | 25 | 0.0001 | 0.0016 |
| 2 | 1 | 95 | 25 | 0.0001 | 0.0016 |
| 3 | 1.5 | 95 | 25 | 0.0001 | 0.0016 |
| 4 | 2 | 95 | 25 | 0.0001 | 0.0016 |
| 5 | 2.5 | 90 | 20 | 0.0001 | 0.0016 |
| 6 | 3 | 87 | 17 | 0.0001 | 0.0016 |
| 7 | 3.5 | 87 | 17 | 0.0001 | 0.0016 |
| 8 | 4 | 87 | 17 | 0.0001 | 0.0016 |
| 9 | 4.5 | 85 | 15 | 0.0001 | 0.0016 |
| 10 | 5.5 | 85 | 15 | 0.0001 | 0.0016 |
| 11 | 6.5 | 85 | 15 | 0.0001 | 0.0016 |

TABLE 2

STANDARD CONDITIONS

| Fan State Index | Fan States | Optimum Differential Pressure Setting | Deadband | High Side Gain | Low Side Gain |
|---|---|---|---|---|---|
| 1 | 1 | 110 | 40 | .0001 | .0016 |
| 2 | 2 | 110 | 40 | .0001 | .0016 |
| 3 | 3 | 105 | 35 | .0001 | .0016 |
| 4 | 4 | 100 | 30 | .0001 | .0016 |
| 5 | 5 | 95 | 25 | .0001 | .0016 |
| 6 | 6 | 95 | 25 | .0001 | .0016 |
| 7 | 7 | 95 | 25 | .0001 | .0016 |

In step 120 the fan state index is checked to determine if the refrigeration system 10 is in the process of starting up. If the fan index state is zero, a start up is in progress and a ball park estimate of the number of condenser fans which should initially be turned on is made using only the saturated condenser temperature to make the ball park estimate. However, such an initial ball park estimate should only be made if the saturated condenser temperature is greater than 40° F. At step 130 saturated condenser temperature is checked to be sure it is greater than 40° F. If saturated condenser temperature is less than or equal to 40° F. and if the differential pressure is less than 70 psid, then no fans are turned on because the pressure in the refrigeration system is too low. If at step 130 the saturated condenser temperature was determined to be less than or equal to 40° F. and if at step 140 it was determined that the differential pressure is greater than 70 psid, then the first fan step is turned on at step 150 and the fan state index set at 1. Effectively, in the standard embodiment one whole fan will be turned on, while in the low ambient embodiment a half capacity fan will be turned on.

If the saturated condenser temperature is greater than 40° F; the ball park estimate of the number of condenser fans to be initially turned on is made at step 160. The following algorithm has been found to provide a good ball park estimate of the number of fans to initialize.

$$IFS = \frac{(SCT - MST)}{AF} + MRFS$$

IFS = Initial Fan State
SCT = Saturated Condenser Temperature
MST = Minimum Start Temperature
AF = Constant Adjustment Factor
MRFS = Minimum Required Fan State
In the Preferred Embodiments
   Min. Start Temp. = 40° F.

Adjustment Factor=20

Min. Required Fan State=1.0 in standard embodiment or 0.5 in the low ambient embodiment As an example using the low ambient embodiment, if the saturated condenser temperature was 70° F. then an initial fan state of 2.5 is required. The requirement of a 2.5 fan state is satisfied by setting a fan state index of 5, thereby effectively turning fans A, B and G on.

The foregoing description of FIG. 2 and the present invention has been directed to the initialization of the control system used whenever the refrigeration system 10 is turned on. Once a fan state index of other than zero has been set, this portion of the condenser fan control system is bypassed until the refrigeration system is restarted. Instead the sequence of steps commencing with step 170 is entered every ten seconds to determine if a condenser fan should be turned on or off. This sequence is best understood with reference to FIGS. 2 and 3 as well as to either Table 1 or 2.

Figure 3:
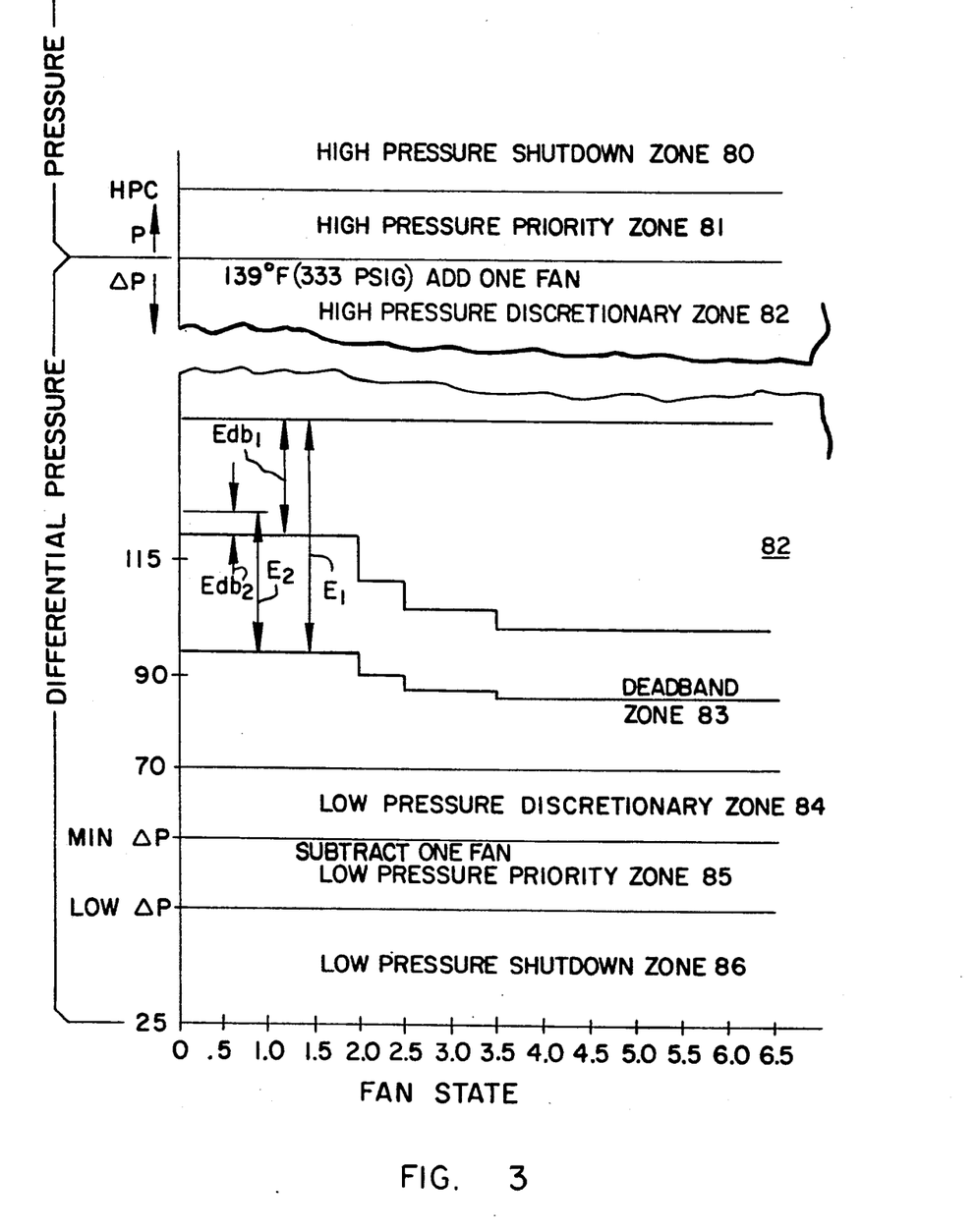
FIG. 3 shows a graph of the present invention comparing the current fan state with the differential pressure between the saturated condenser pressure and the saturated evaporator pressure.

FIG. 3 is a graph of differential pressure (and pressure) versus fan state and includes seven control zones. These zones are, from top to bottom, a high pressure shut down zone 80, a high pressure priority zone 81, a high pressure discretionary zone 82, a dead band zone 83, a low pressure discretionary zone 84, a low pressure priority zone 85, and a low pressure shut down zone 86. The high and low pressure shut down zones 80, 86 are controlled by pressure sensitive trip switches (not shown) and operate independently of the present invention. It should be noted that the high pressure shutdown zone 80 and the high pressure priority zone 81 are graphed and affected by condenser pressure, unlike the other zones which are graphed and affected by the differential pressure between the high and low sides of the refrigeration system.

Figure 5:
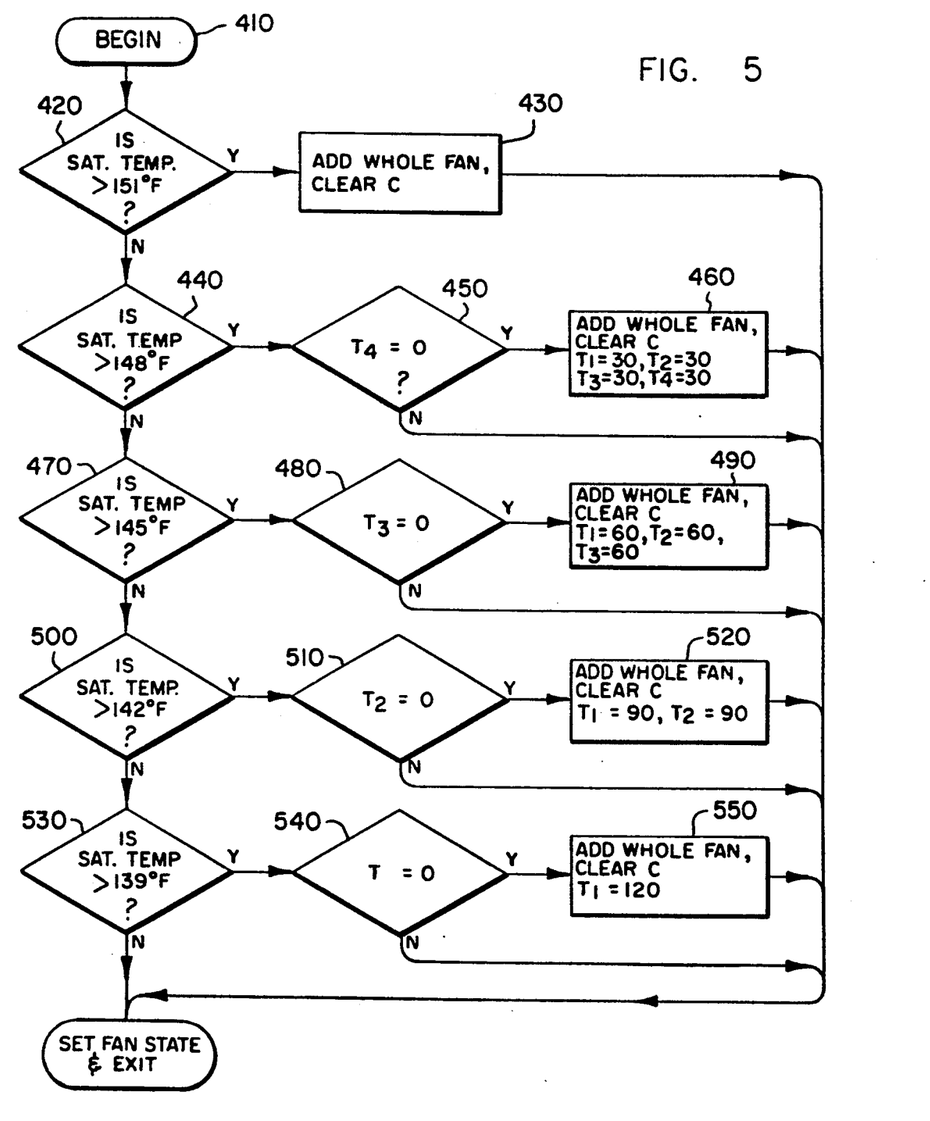
FIG. 5 shows an operational flow chart of the system safety device protection system of the present invention.

The high and low pressure priority zones 81, 85 are zones immediately adjacent the high and low pressure shut down zones 80, 86 on FIG. 3, and provide an indication that system pressures are entering extreme ranges and that corrective measures should immediately be taken. The corrective measures for the high priority zone 81 are shown in FIG. 5, while the corrective measures for the low priority zone 85 are shown in steps 200 through 220 of FIG. 2 where a condenser fan A-G is immediately turned off if the low pressure priority zone 85 is entered. The system pressure is considered to be in the high pressure priority zone 81 if a maximum system pressure, or a warning limit, has been exceeded, while the system pressure is considered to be in the low pressure priority zone 85 if a minimum system pressure differential or warning limit is passed. In the preferred embodiment the maximum system pressure is considered to be exceeded if the saturated condenser temperature is greater than 139° F; while the minimum pressure differential is considered to be passed if pressure differential falls below approximately 60 psid. In either case corrective measures are taken by immediately controlling condenser fans A-G to either increase or decrease the system pressure differential and decrementing or incrementing the fan state index accordingly.

As shown in FIG. 5, when in the high pressure priority zone 81 the condenser fans A-G are used to prevent a system safety device such as a high pressure cutout from ever reaching its trip point, and consequently, from ever tripping and shutting down the refrigeration system. This ensures the refrigeration system will continue to operate at times when previous systems have shutdown due to a system safety device tripping.

The system safety device protection system 400 is entered every 400 milliseconds in the preferred embodiment beginning at step 410. This protective system 400 will override the control system shown in FIG. 2 whenever saturated condenser temperature exceeds a warning limit of approximately 139° F. A check for this is made at step 530 and a full capacity fan A-G is turned on at step 550 in an attempt to reduce the system pressure. A first timer $T_1$ is set to provide a delay of a 120 seconds before the next condenser fan is turned on. As long as the saturated condenser temperature remains above 139° F. the timer $T_1$ is continually checked at step 540, and a second whole fan will be turned on if the timer $T_1$ expires while the saturated condenser temperature remains above 139° F. In the preferred embodiments similar warning limits of 142° F. 145° F. 148° F; and 151° F. are established at step 500, step 470, step 440 and step 420 respectively, each of which progressively approaches the trip point of the high pressure cutout and each of which responds to the increasing system pressure in progressively shorter periods of time. The warning limits form a buffer region between the preferred range of operating pressures and the trip point of the high pressure cutout. For example, at step 500 if saturated condenser temperature is greater than 142° F; a whole fan is added, and a timer $T_2$ for step 500 and the timer $T_1$ for step 530 are each set for 90 seconds. However, at step 470 if saturated condenser temperature is greater than 145° F; a whole fan is added, the timers $T_1$ and $T_2$ for steps 500 and 530 are set at 60 seconds, and an additional timer $T_3$ for step 470 is also set at 60 seconds. At step 440 saturated condenser temperature is compared to 148° F. and a whole fan is turned on at step 460. The timers $T_1$, $T_2$ and $T_3$ for steps 530, 500 and 470 respectively are each set at 30 seconds and a timer $T_4$ for step 440 is set at 30 seconds. As previously mentioned, the timers $T_1$, $T_2$, $T_3$ and $T_4$ are real-time timers provided for application program use by the microprocessor used in the system controller 20. However, if a microprocessor lacking such timers is used, timers can be implemented using the 400 millisecond interrupt cycle of the system safety device protection system 400 where each 2.5 interrupts are counted as 1 second.

At step 420, which is the closest warning limit to the high pressure trip point, saturated condenser temperature is compared to 151° F. If the saturated condenser temperature exceeds 151° F; one whole fan is immediately turned on at step 430. No timers are set or altered. Since the protection system 400 is entered on a 400 millisecond cycle, if the saturated condenser temperature exceeds 151° F; effectively all of the condenser fans A-G will be turned on in a very short period of time.

At temperatures below 150° F. the time delays $T_1$ through $T_4$ are set by the last step of steps 440, 470, 500 or 530 to have turned on a condenser fan. This has the advantage that the time delays will decrease in length as the pressure rises, through step 530, 500, 470, and 440, but will initially remain short as the pressure falls from a higher level. For example, if the saturated condenser temperature exceeded 145° and a whole condenser fan was turned on, the timers $T_1$ and $T_2$ for the lower steps 530 and 500 are each set at 60 seconds instead of 120 seconds and 90 seconds respectively. This ensures that as pressure rises, preventive measures are continually taken to drive the system pressure down quickly.

Additionally, when a condenser fan is turned on in each of steps 430, 460, 490, 520 and 550, the discretionary zone fan control aspects of the present invention are disabled temporarily by clearing a cumulative pressure counter C used by the discretionary zone fan control portion of the invention.

Returning to FIGS. 2 and 3, if the differential pressure has fallen below the minimum differential pressure at step 200, then the fan state index is decreased so that a fan A-G is immediately turned off at step 220 in an attempt to raise the system differential pressure. Additionally, a timer is set to prevent any further fans from being turned off for a predetermined amount of time, this time being 30 seconds in the preferred embodiment. The discretionary fan control aspects of the present invention are disabled by clearing the cumulative pressure counter C.

If the system pressure differential is not in one of the four extreme zones 80, 81, 85, 86 discussed above, the pressure differential is either in the high or low pressure discretionary zones 82, 84 or the dead band zone 83.

In the dead band zone 83, no fan control actions are taken because the system pressure differential is within an acceptable range of a predetermined optimum pressure differential. This acceptable range is graphically shown as the deadband zone 83. However, since low fan states are indicative of lower ambient temperatures and since pressure changes are greater with lower ambient temperatures, the dead band 83 encompasses a greater range of pressure differentials at lower fan states than at higher fan states. This is shown in FIG. 3 and Table 1 where the vertical size of the dead band 83 is greatest for fan states 0.5 through 2, and smallest for fan states 4.5 through 6.5. Similarly, in Table 2, the dead band 83 is greatest for fan states 1 and 2 and smallest for fan states 5 through 7.

As shown in Columns 2 and 3 of Table 1, the dead band for each fan state is symmetric about the predetermined optimal differential pressure setting. For example, in fan state 1.5 the optimum pressure differential setting is considered to be 95 psig in the preferred embodiment with the dead band ranging 25 psid above and below this optimal differential pressure setting. However, in fan state 5.5 the dead band range is only 15 psid above and below the optimal differential pressure setting of 85 psid. The optimal differential pressure settings and dead bands are selected such that the lower pressure side of the dead bands for all fan states are approximately equal to the minimum operable system pressure. In the preferred embodiment this minimum operable system pressure is approximately 70 psid. This, of course, will vary from system to system.

If the differential pressure is in either the high or low pressure discretionary zone 82, 84, pressure over time in the zone is accumulated and saved as cumulative pressure C. When the cumulative pressure exceeds a predetermined trip point, the fan state index is increased by one and a condenser fan A-G is controlled on if the differential pressure is in the high pressure discretionary zone 82. On the other hand, if the cumulative pressure exceeds the predetermined trip point, the fan state index is decreased by one and a condenser fan A-G is controlled off if the differential pressure is in the low pressure discretionary zone 84. In the preferred embodiment the predetermined trip point is approximately 1.0 for the high pressure discretionary zones 82 and approximately $-1.0$ for the low pressure discretionary zone 84. These trip points will vary from system to system.

Referring again to FIG. 2 and more particularly to step 230, the procedure by which the control system determines which zone it is in and whether to add a fan or subtract a fan will now be explained. At step 230 the fan state index is used as an index into Table 1, or Table 2 if under standard conditions, and the optimum differential pressure setting and dead band for the particular fan state are determined. Additionally high and low side gain factors are determined as $K_i$ and $K_e$ respectively, and cumulative pressure C is acquired from a storage location in the system controller 20. The deviation E from the optimal pressure differential setting is determined by subtracting the actual system pressure differential from the optimum differential pressure setting. Two examples of the deviation E from the optimal differential pressure setting into the high pressure discretionary zone 82 are indicated in FIG. 3 by the vertical lines E1 and E2.

At step 240 a determination is made whether the deviation E from the optimal differential pressure setting is positive or negative and separate routines 250 or 260 are initiated depending upon that determination. If the deviation E is negative, then the calculated differential pressure is greater than the optimum pressure and the high side routine starting at step 250 should be used. However, if the deviation E is positive, then the calculated differential pressure is less than the optimum pressure and the low side routine starting at step 260 should be used. These routines are essentially similar with several exceptions. The low side gain factor $K_e$ is much greater than the high side gain factor $K_i$ to ensure that corrective action will be taken more quickly on the low pressure side. Another exception involves the fairly obvious fact that fans are turned off on the lower pressure side to increase system pressure while fans are turned on the high pressure side to decrease system pressure. Additionally. specific compensation factors to accelerate system response under specific conditions are introduced in the high and low side calculations which will be brought out in the following discussions.

If at step 240 the deviation E has been determined to be greater than zero then a determination is made at steps 250 and 270 to decide if the deviation E is large enough to exceed the upper limits of the dead band 83. This is done by adding an offset (os) and the size of the deadband to the deviation E to obtain a dead band deviation $E_{db}$, which also indicates the dimension by which the dead band may be exceeded. The offset is determined by subtracting 60 from the temperature of the medium being cooled, as measured at the sensor 52, then ensuring that the offset falls in the range of 0 through 20. Since deviation E is a negative quantity, the dead band deviation $E_{db}$ will be negative if the dead band is exceeded. If $E_{db}$ is not less than zero then the differential pressure is within the dead band and no action need be taken other than to clear any cumulated pressure C at step 280. However if the dead band deviation $E_{db}$ is less than zero, then the differential pressure exceeds the dead band 83 and the control system must determine at step 290 whether or not an additional condenser fan A-G should be turned on. This determination is made by adding the change in cumulative pressure occurring since the control algorithm last ran approximately ten seconds previously to the cumulative pressure C. The change in pressure is determined by multiplying the dead band deviation $E_{db}$ by the time period involved T, by a compensation factor CF and by the appropriate high side gain factor $K_i$. The system designer can use high side gain factor $K_i$ to adjust the speed at which the control system reacts. The compensation factor CF reduces the time to turn on a fan as the pressure gets high. The formulas are shown as follows:

$$C = C + \Delta C$$
$$\Delta C = CFK_iTE_{db} \quad \text{if in high side discretionary pressure zone 82}$$
$$\Delta C = K_eT(E_{db} + 9) \quad \text{if in low side discretionary pressure zone 84}$$

WHERE $C$ = Cumulative pressure
$\Delta C$ = Change in cumulative pressure
$K_i$ = High side gain
$K_e$ = Low side gain
$T$ = Ten seconds
$E_{db}$ = Differential pressure in excess of the dead band
$CF$ = Compensation factor
= 0.0976 (Sat. Cond. Temp. $-118$) + 1
where $1.0 \leq CF \leq 4.0$ If the cumulative pressure is greater than the high side trip point of 1.0 used in the preferred embodiments, then the fan state index is increased, a fan A–G is turned on and the cumulative pressure is cleared. If the cumulative pressure is not greater than the trip point, the control system is exited. In either case the new cumulative pressure C is stored at step 320 and the fan state saved in the process of exiting.

The low side discretionary zone 84 is handled in a manner very similar to the high side discretionary zone 82. A determination is made at steps 260 and 330 as to whether the deviation E from the optimal pressure differential setting is within the dead band 83. Since the deviation E is a positive number the size of the dead band is subtracted from the deviation E to obtain the dead band deviation $E_{db}$. If the deviation E is within the dead band 83 as evidenced by $E_{db}$ less than zero, the cumulative pressure C is cleared at step 280 and the control system is exited. If the deviation E is not within the dead band 83 as evidenced by $E_{db}$ being greater than zero, the change in cumulative pressure is then determined, using the formula described above, by multiplying the dead band deviation $E_{db}$ by the time period involved T and by the low side gain factor $K_e$. Additionally, the dead band deviation $E_{db}$ is adjusted by a value of 9 to provide a faster response when the differential pressure is low. The change in cumulative pressure is added to the total cumulative pressure C at step 340 and the total cumulative pressure C is compared at step 350 with a trip point of $-1.0$ in the preferred embodiments. If the trip point is exceeded, the fan state index is decreased, a fan A–G is turned off and the cumulative pressure C is cleared. A fan state of less than 0.5 is not allowed after the initial start sequence has been completed.

The operation of the discretionary pressure zones 82, 84 can be understood with reference to an example using the high pressure discretionary zone 82 shown in FIG. 3 and more particularly to a comparison of the amounts by which the deviations $E_1$ and $E_2$ exceed the dead band 83. These amounts are indicated in FIG. 3 as $E_{db1}$ and $E_{db2}$, respectively. If the trip point is assumed to be less than $E_{db1}$ and greater than $E_{db2}$, then a condenser fan A–G will immediately be turned on when a differential pressure of $E_{db1}$ is encountered by the control system because $E_{db1}$ is greater than the trip point. However, if a differential pressure of the size of $E_{db2}$ is encountered, a condenser fan will not immediately be turned on because $E_{db2}$ is less than the trip point. Instead, the change in cumulative pressure will be added to cumulative pressure C until the value of $E_{db2}$ has remained above the dead band in the high pressure discretionary zone 82 long enough for the cumulative pressure to exceed the trip point shown in FIG. 3. At such time a condenser fan A–G will be turned on.

Although the preferred embodiment of the present invention has been described in terms of a seven fan condenser, the actual number of fans required by the condenser will depend both on the design of the system and the size of the condenser. For example, FIGS. 4A and 4B show the condenser modifications which allow the use of half capacity fans in a thirteen fan condenser.

FIG. 4A shows a standard condenser 60 including thirteen full flow fans 61, 62, 63, 64, 65, 66, 67, 68, 69, 70, 71, 72 and 73 arranged in two parallel circuits 77 and 78. The operation of air cooled condensers during low ambient temperature conditions requires that the condenser airflow be reduced progressively as the ambient temperature decreases so that the condenser pressure and temperature are maintained at the level necessary for proper system operation. FIG. 4B shows a condenser 59 for use in the present invention where half flow fans 74 and 75 replace full flow fans 61 and 62, and an additional full flow fan 76 is added to maintain a thirteen fan capacity. The half flow fans 74 and 75 are tailored to produce approximately one-half the normal cubic feet per minute flow of the full flow fans. At the lowest operational ambient temperature, only the half flow fans 74 or 75 will be on in each condenser circuit, thereby reducing condenser airflow to the minimum levels required for proper system pressure control.

The substitution of a half capacity fan, as opposed to the use of a half speed fan or the like, has the advantage that a simple fan exchange can be made without replacing motors or adding control circuitry. Additionally, the major difference in controlling a seven fan system and a thirteen fan system is in the number of fan states contained in Table 1. The control algorithm itself is unchanged.

The present invention has been described as a condenser fan control system for use with a variable capacity compressor in a refrigeration system. The system operates to maintain the minimum operable system pressure without receiving any feedback from the variable capacity compressor indicating the present capacity of the variable speed compressor, or any feedback indicative of the present outdoor air temperature.

The invention can be broadly described as comparing a state of the refrigeration system, such as differential pressure, to an optimum state, and controlling condenser fans if a difference between the actual and optimum states exceeds a predetermined value. Another way of describing the invention is to say that condenser fans are controlled if the difference between an actual state of a refrigeration system and an optimum refrigeration state does not fall within a dead band around the optimum state.

Although the present invention is described in connection with the preferred embodiment above, it is apparent that many alterations and modifications are possible without departing from the present invention. Such alterations and modifications could involve varying the number and size of the condenser fans used, as well as the system components. Additionally, the gain factors, the trip point, the dead bands and the zones could all be altered in a variety of ways. Furthermore, since temperature and pressure are directly proportional and can be easily converted from one to the other, applicant's invention can be modified to operate using either, or a combination of both. It is intended that all such alterations and modifications be considered within the scope and spirit of the invention as defined in the following claims.

What is claimed and desired to be secured by Letters Patent of the United States is:

1. A method of controlling a multiplicity of condenser fans in a refrigeration system comprising the steps of:
   determining the respective states of a high pressure side and a low pressure side of the refrigeration system;
   calculating the first difference in state between the high pressure side and the low pressure side of the refrigeration system;
   determining an optimum state for the refrigeration system;
   determining a second difference in state between the first difference and the optimum difference; and
   controlling the multiplicity of condenser fans if the second difference exceeds a predetermined value.

2. The method of claim 1 including the further step of not controlling condenser fans if the second difference is within a predetermined dead band which is symmetric about the optimum state.

3. The method of claim 1 wherein the step of calculating the first difference includes the step of using saturated condenser temperature and saturated evaporator temperature as a basis for the calculation.

4. The method of claim 1 wherein the step of determining the second difference includes the further step of periodically determining a change in the second difference, and adding the change to a cumulative difference.

5. The method of claim 4 wherein the change in the second difference is determined by multiplying a gain factor by the amount of time which has passed since the last periodic determination, with the difference between the second difference and a predetermined dead band.

6. The method of claim 5 wherein a first gain factor is used for low side pressures and a second gain factor is used for high side pressures.

7. The method of claim 1 including the further step of substituting a half capacity fan for a full capacity fan in the condenser.

8. The method of claim 7 including the further step of leaving only the half capacity fan on at the lowest operational ambient temperatures.

9. A method of controlling a multiplicity of condenser fans in a refrigeration system comprising the steps of:
   determining the respective states of a high pressure side and a low pressure side of the refrigeration system;
   calculating a first difference in state between the high pressure side and the low pressure side of the refrigeration system;
   determining an optimum state dead band for the refrigeration system;
   comparing the first state of the optimum state dead band; and
   controlling the multiplicity of condenser fans if the first difference in state does not fall within the optimum state dead band.

10. A method of controlling a multiplicity of condenser fans in a refrigeration system comprising the steps of:
    determining the respective pressures of a high pressure side and a low pressure side of the refrigeration system;
    calculating a first pressure difference between the high pressure side and the low pressure side of the refrigeration system;
    determining an optimum pressure difference for the refrigeration system;
    determining a second pressure difference using the difference between the first pressure difference and the optimum pressure difference;
    determining a cumulative pressure using the second pressure difference; and
    controlling the multiplicity of condenser fans if the cumulative pressure exceeds a predetermined value.

11. The method of claim 10 wherein the step of controlling condenser fans includes the further step of turning condenser fans on if the second pressure difference is positive in value.

12. The method of claim 11 wherein the step of controlling condenser fans includes the further step of turning condenser fans off if the second pressure difference is negative in value.

13. The method of claim 10 including the further step of turning at least one condenser fan on immediately if a predetermined maximum pressure is exceeded.

14. The method of claim 13 including the further step of considering the predetermined maximum pressure to be exceeded if saturated condenser temperature exceeds a predetermined temperature.

15. The method of claim 14 where the predetermined temperature is 139° F.

16. The method of claim 10 including the further step of turning a condenser fan off immediately if the first pressure difference is less than a predetermined minimum system differential pressure.

17. A method of claim 16 where the minimum differential pressure is approximately 60 psig.

18. The method of claim 10 including the further step of delaying the operation of the method if a predetermined timer is running.

19. The method of claim 10 including the further step of clearing the cumulative pressure if the second pressure difference is within a predetermined dead band.

20. The method of claim 10 including the further step of not controlling condenser fans if the second pressure difference is within a predetermined dead band which is symmetric about the optimum pressure difference.

21. The method of claim 10 wherein the step of calculating the first pressure difference includes the step of using saturated condenser temperature and saturated evaporator temperature as a basis for the calculation.

22. The method of claim 10 wherein the step of determining the optimum pressure difference includes the further step of indexing a lookup table to obtain the optimum pressure difference using a current fan state as the index.

23. The method of claim 10 including the further step of initializing the refrigeration system at start up using saturated condenser temperature to provide a ball park estimate of the number of condenser fans to be initially turned on.

24. The method of claim 23 where the ball park estimate is made using the following formula:

$$IFS = \frac{(SCT - MST)}{AF} + MRFS$$

IFS = Initial Fan State
SCT = Saturated Condenser Temperature
MST = Minimum Start Temperature
AF = Constant Adjustment Factor
MRFS = Minimum Required Fan State 25. The method of claim 24 wherein the minimum start temperature is 40°, the adjustment factor is 20 and the minimum required fan state is 1 under standard conditions or 0.5 under low ambient conditions.

26. The method of claim 10 wherein the step of determining the cumulative pressure includes the further step of periodically determining a change in cumulative pressure difference and adding the change to the previous cumulated pressure.

27. The method of claim 26 wherein the change in pressure is determined by multiplying a gain factor by the amount of time which has passed since the last periodic determination, and by the difference between the second pressure difference and a predetermined dead band.

28. The method of claim 27 wherein a first gain factor is used for low side pressures and a second gain factor is used for high side pressures.

29. The method of claim 28 wherein the first gain factor is greater in value than the second gain factor.

30. The method of claim 29 wherein the predetermined value is approximately 1.0 on the high pressure side of the refrigeration system and approximately −1.0 on the low pressure side of the refrigeration system.

31. The method of claim 10 wherein the predetermined value is approximately 1.0 on the high pressure side and approximately −1.0 on the low pressure side.

32. The method of claim 10 including the further step of substituting a half capacity fan for a full capacity fan in the condenser.

33. The method of claim 32 including the further step of turning only the half capacity fan on at the lowest operational ambient temperatures.

34. The method of claim 33 including the further step of using the half capacity fan to step through condenser fan stages.

35. The method of claim 10 wherein the step of determining a cumulative pressure includes the step of subtracting a dead band from the second pressure difference and adding any remainder to the cumulative pressure.

36. A method of controlling a multiplicity of condenser fans in a refrigeration system comprising the steps of:
determining the respective temperatures of a high pressure side and a low pressure side of the refrigeration system;
calculating a first temperature difference between the high pressure side and the low pressure side of the refrigeration system;
determining an optimum temperature difference for the refrigeration system;
determining a second temperature difference between a first temperature difference and the optimum temperature difference;
determining a cumulative temperature using the second temperature difference; and
controlling the multiplicity of condenser fans if the cumulative temperature exceeds a predetermined value.

37. The method of claim 36 wherein the step of controlling condenser fans includes the further step of turning condenser fans on if the second temperature difference is positive in value.

38. The method of claim 37 wherein the step of controlling condenser fans includes the further step of turning condenser fans off if the second temperature difference is negative in value.

39. The method of claim 37 including the further step of turning a condenser fan on immediately if a predetermined maximum temperature is exceeded.

40. The method of claim 39 including the further step of considering the maximum temperature to be exceeded if condenser pressure exceeds a predetermined value.

41. The method of claim 36 including the further step of turning a condenser fan off immediately if the first temperature difference is less than a predetermined minimum system differential temperature.

42. The method of claim 36 including the further step of clearing the cumulative temperature if the second temperature difference is within a predetermined dead band.

43. The method of claim 36 including the further step of not controlling condenser fans if the second temperature difference is within a predetermined dead band which is symmetric about the optimum temperature difference.

44. The method of claim 36 including the further step of initializing the refrigeration system at start up using condenser pressure to provide a ball park estimate of the number of condenser fans to be initially turned on.

45. The method of claim 44 where the ballpark estimate is made using the following formula:

$$IFS = \frac{(CP - MSP)}{AF} + MRFS$$

IFS = Initial Fan State
CP = Condenser Pressure
MSP = Minimum Start Pressure
AF = Constant Adjustment Factor
MRFS = Minimum Required Fan State 46. The method of claim 36 wherein the step of determining the cumulative temperature includes the further step of periodically determining a change in cumulative temperature difference and adding the change to the previous cumulated temperature.

47. The method of claim 46 wherein the change in temperature is determined by multiplying a gain factor by the amount of time which has passed since the last periodic determination with the difference between the second temperature difference and a predetermined dead band.

48. The method of claim 47 wherein a first gain factor is used for low side temperatures and a second gain factor is used for high side temperatures.

49. The method of claim 48 wherein the first gain factor is greater in value than the second gain factor.

50. The method of claim 36 including the further step of substituting a half capacity fan for a full capacity fan in the condenser.

51. The method of claim 50 including the further step of leaving only the half capacity fan on at the lowest operational ambient temperatures.

52. The method of claim 51 including the further step of using the half capacity fan to step through condenser fan stages.

53. The method of claim 36 wherein the step of determining a cumulative temperature includes the step of subtracting a dead band from the second temperature difference and adding any remainder to the cumulative temperature.

54. A refrigeration system comprising:
an evaporator;
a compressor operably connected to the evaporator;
a condenser operably connected to the compressor and including a housing, a plurality of full capacity condenser fans supported by the housing, and at least one half capacity condenser fan supported by the housing;
an expansion valve operably connected to the evaporator and the condenser;
means for determining a system pressure differential; and
means, responsive to said pressure differential determining means, for controlling said full capacity fans and said half capacity fan to maintain the lowest operable system pressure.

55. The system of claim 54 further including means for controlling the operation of the half capacity condenser fan at low operational ambient temperatures.

56. The system of claim 54 further including a variable capacity compressor.

57. The system of claim 54 wherein the fan control means further includes:
means for cumulating a pressure difference between the system pressure differential and an optimum pressure differential.

58. The system of claim 57 further including means for immediately controlling a fan if the system pressure differential is outside of a predetermined range.

59. The system of claim 58 further including means for inhibiting control if the system pressure differential is within a predetermined deadband zone.

60. The system of claim 54 including means, operably connected to and controlling said condenser fans, for protecting a system safety device from reaching a trip point.

61. A method or protecting a refrigeration system from high pressure damage comprising the steps of:
continually monitoring the refrigeration system pressure;
sequentially comparing the system pressure to a series of high pressure warning limits which progressively approach a high pressure cutout trip point in value; and
turning on at least one condenser fan immediately if the system pressure exceeds the warning limit.

62. The method of claim 61 wherein each of said warning limits has a time delay, and said time delays decrease in lengths as the warning limits progressively approach the trip point in value.

63. The method of claim 61 wherein the step of turning on a least one condenser fan includes the further step of setting a time delay which prevents another condenser fan from turning on until the time delay expires.

64. A method of using condenser fans to prevent damage to a refrigeration system comprising the steps of:
determining the approximate trip point of a refrigeration system safety protection device;
establishing several warning limits which progressively approach the system trip point wherein each warning limit is at a point which is closer to the preferred range of operation than the trip point and wherein a time delay is associated with at least one warning limit;
monitoring the state of the refrigeration system; and
turning on a condenser fan if the state of the refrigeration system exceeds the warning limit.

65. The method of claim 64 wherein the limit closest to the system trip point does not have a time delay.

66. The method of claim 64 wherein the refrigeration state being monitored is pressure.

67. The method of claim 64 wherein the refrigeration state being monitored is temperature.

* * * * *